United States Patent
Stallinga

(12) 
(10) Patent No.: US 6,707,779 B2
(45) Date of Patent: Mar. 16, 2004

(54) OPTICAL SCANNING DEVICE WITH A SELECTIVE OPTICAL DIAPHRAGM

(75) Inventor: Sjoerd Stallinga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 238 days.

(21) Appl. No.: 09/897,367

(22) Filed: Jul. 2, 2001

(65) Prior Publication Data

US 2002/0018431 A1 Feb. 14, 2002

(30) Foreign Application Priority Data

Jul. 10, 2000 (EP) .............................. 00202452

(51) Int. Cl.[7] .............................................. G11B 7/00
(52) U.S. Cl. ................... 369/112.02; 369/118
(58) Field of Search ............ 369/112.01, 112.02, 369/112.16, 112.22, 116, 118, 121, 117; 250/201.5, 201.2, 201.3, 216

(56) References Cited

U.S. PATENT DOCUMENTS 5,281,797 A    1/1994 Tatsuno et al. .......... 250/201.5
5,353,247 A * 10/1994 Faris ........................ 365/108
5,683,622 A * 11/1997 Kratzschmar et al. . 252/299.01
5,793,734 A    8/1998 Tsuchiya et al.

FOREIGN PATENT DOCUMENTS

| EP | 0685749 A1 | 6/1995 |
|----|-----------|--------|
| EP | 0932145   | 7/1999 |
| JP | 10241191  | 9/1998 |
| WO | WO 9721215 | 6/1997 |

OTHER PUBLICATIONS

Patent Abstracts of Japan; Pub. No. 10143900 A, May 29, 1998; "Optical Pickup Device".
Patent Abstracts of Japan; Pub. No. 10086334 A, Apr. 7, 1998; "Adjusting Device for Form Plate".

* cited by examiner

*Primary Examiner*—Paul W. Huber
(74) *Attorney, Agent, or Firm*—Michael E. Belk

(57) ABSTRACT

An optical scanning device comprising means for scanning optical record carriers of predetermined different formats, such as CDs and DVDs, using scanning at different numerical apertures provided by an optical diaphragm. The optical diaphragm comprises cholesteric liquid crystal material of one or more selected helical pitches which provide the diaphragm with desired wavelength- and/or polarization-selective characteristics.

24 Claims, 4 Drawing Sheets

OPTICAL SCANNING DEVICE WITH A SELECTIVE OPTICAL DIAPHRAGM

This invention relates to an optical scanning device for scanning an optical record carrier, the device comprising a radiation source for generating a radiation beam of a predetermined wavelength, which beam is directed along an optical axis of the system, and an optical diaphragm for reducing the intensity of a portion of the beam. The invention also relates to an optical diaphragm for use in scanning an optical record carrier using a radiation beam of a predetermined wavelength. In particular, but not exclusively, the invention relates to an optical scanning device for scanning an optical record carrier, such as an optical disc, in which the numerical aperture (NA) may be altered in use.

Different physical formats of optical disc are designed to be read out, and in the case of recordable or rewritable optical discs, written to, using different wavelengths and NAs. For example, standard compact discs (CDs), are designed to be read with a wavelength of 780 nm and an NA of 0.45. Standard digital video discs (DVDs), are designed to be read with a wavelength of 650 nm and an NA of 0.6. Standard rewritable DVDs (DVD+RWs) are designed to be written and read with a wavelength of 660 nm and an NA of 0.65. Standard recordable DV discs (DVRs) are designed to be written and read with a wavelength of 400 nm and an NA of 0.85.

It would be desirable to provide an optical scanning device having an optical system which is compatible with more than one of the standard physical formats. For example, a combined CD and DVD-compatible device in which the NA of the optical system is altered from 0.6 to 0.45 when the wavelength of the radiation is altered from 650 nm to 780 nm. In order to achieve this, an outer annular ring of the objective lens of the optical system may be designed to cut out radiation of 780 nm wavelength. If this is done, this outer part of the objective lens can be optimised for DVD scanning, without affecting the performance of the device when scanning CDs.

It is known to use a dichroic annular filter which cuts out 780 nm radiation but is transmissive to 650 nm radiation in a region of the radiation beam which falls on the outer part of an objective lens. However, this is a relatively expensive component. It would be desirable to provide an alternative way of altering the numerical aperture when radiating different wavelengths in an optical scanning device.

It would also be desirable to provide a way of selectively switching between different NAs of an optical system, without necessarily altering the wavelength of radiation. It is for example possible to adopt a scanning device to read different formats of optical disc by only altering the NA of the optical system, without altering the wavelength so that a single wavelength laser system may be used.

International Patent Application WO 97/21215 describes an optical scanning device for optical discs, which is capable of reading and/or writing both CDs and DVDs. A diaphragm is formed by a polarising filter which is associated with the objective lens. To switch between the different formats, a half-wave plate, along with a divergent lens to correct for spherical aberrations created by different information layer depths in the different formats of discs, is mechanically inserted or removed from the optical path of the system. The half-wave plate alters the linear polarisation of the radiation by 90° and therefore switches between the different numerical apertures provided by the polarising filter. However, the mechanical insertion and removal of the half-wave plate requires mechanical actuators which complicate the design of the optical system and tend to increase the expense of manufacture of such a system.

JP-A-10143900 describes an optical disc pick-up device having means for altering a numerical aperture of the radiation beam radiated onto the optical disc, which is similar to that described in WO 97/21215.

JP-A-1086334 describes an optical scanning advice in which the numerical aperture of the beam radiated onto an optical disc may be altered by means of selectively diffractive optical elements based on a control signal. It would be desirable to provide an alternative to such an arrangement.

EP-A-0932145 describes an optical scanning device in which the numerical aperture of the beam radiated onto an optical disc may be altered selectively, in dependence on the wavelength of the radiation being used. A polarisation plate having an annular polarised region acts as a polarisation-selective optical diaphragm. A radiation source capable of producing two different wavelengths of radiation beam, at different polarisations, is used. It would be desirable to provide an alternative arrangement.

In accordance with one aspect of the present invention there is provided an optical scanning device for scanning an optical record carrier, said device comprising a radiation source for generating a radiation beam of a predetermined wavelength, which beam is directed along an optical axis of the device, and an optical diaphragm for reducing the intensity of a portion of the beam, characterised in that said optical diaphragm includes a cholesteric liquid crystal material having a helical pitch selected to provide internal reflection of said portion of the beam.

In accordance with a further aspect of the invention there is provided an optical diaphragm for use in scanning an optical record carrier using a radiation beam of a predetermined wavelength, said optical diaphragm being for reducing the intensity of a portion of the beam, characterised in that said optical diaphragm includes a cholesteric liquid crystal material having a helical pitch selected to provide internal reflection of said portion of the beam.

Cholesteric liquid crystals, in common with other types of liquid crystal, are formed of long molecules which on average lie in one direction. This direction is referred to as the director, and is indicated by means of a vector n. Although the molecules do not exhibit symmetry between their two ends, on average as many molecules are aligned in the direction of n as in the opposite direction. Therefore, n and −n are equivalent. Nematic liquid crystals without external influence naturally adopt an arrangement in which the director is uniform throughout. In contrast, cholesteric liquid crystals, without any external influence naturally adopt rangement in which the director varies helically in direction about a helical axis. In each plane perpendicular to the helical axis, the director is uniform and parallel to the plane. The angle between the director and a reference director perpendicular to the vertical axis varies linearly along the helical axis. The distance over which the director turns through 360° is referred to as the helical pitch p.

Similar to other liquid crystals, cholesteric liquid crystals are birefringent. Radiation with a linear polarisation parallel to the director experiences a refractive index $n_e$, whereas radiation with a linear polarisation perpendicular to the director experiences a different refractive index $n_o$. A cholesteric liquid crystal layer can exhibit various optical properties depending on the refractive indices $n_e$ and $n_o$ and the vertical pitch p of the cholesteric material, the wavelength λ and angle of incidence θ with respect to the helical axis of the material of the incident radiation and the thickness of the layer. One such property is polarisation-selective (substantially total)-internal reflection. When θ=0, a reflection band occurs between $\lambda_{min}=n_op$ and $\lambda_{max}=n_ep$. The polarisation-selective nature of the reflection lies in the fact that only one circular polarisation is reflected, that having the same handedness as the cholesteric helix. The layer is (substantially fully) transmissive to radiation of the opposite circular polarisation. When θ≠0, the reflection band occurs between $\lambda_{min}=n_op\sqrt{1-\sin\theta^2/\bar{n}^2}$ and $\lambda_{max}=n_ep\sqrt{1-\sin\theta^2/\bar{n}^2}$, where $\bar{n}=(n_o+n_e)/2$.

Further features and advantages of various embodiments of the invention will become apparent from the following description, given by way of example only, of preferred embodiments of the invention, which refers to the accompanying drawings, wherein.

Figure 4:
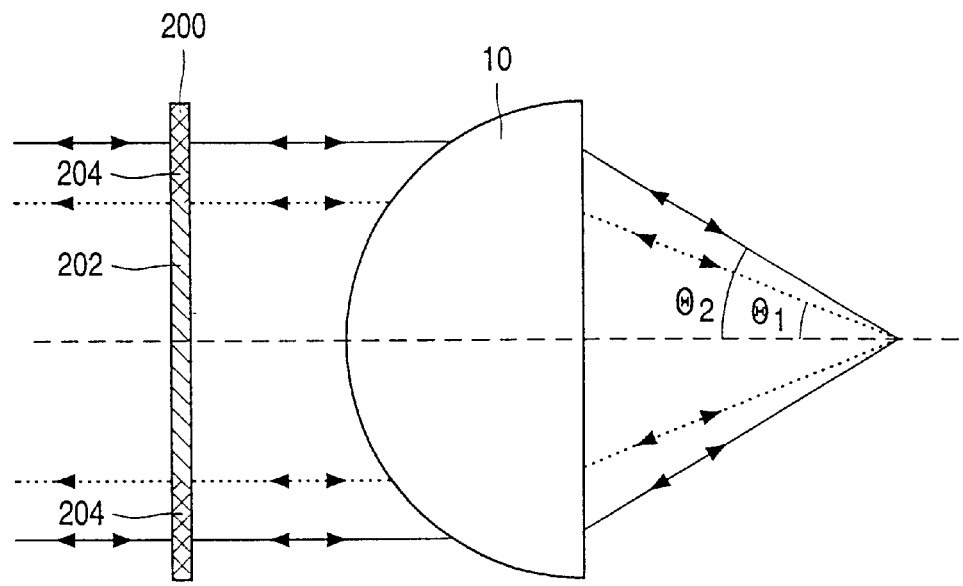
FIG. 4 is a schematic illustration of a second embodiment of the invention.
Figure 5A:
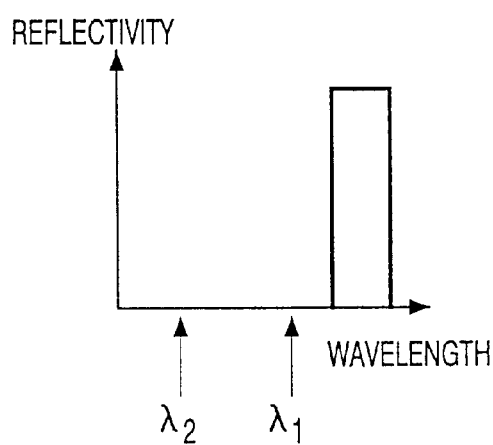
Figure 5B:
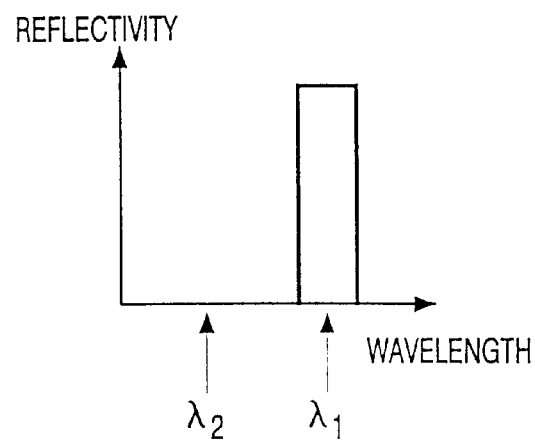
Figure 6A:
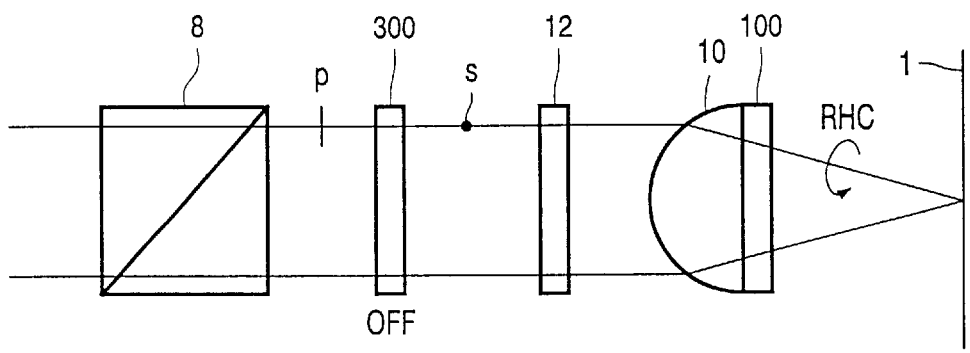
Figure 6B:
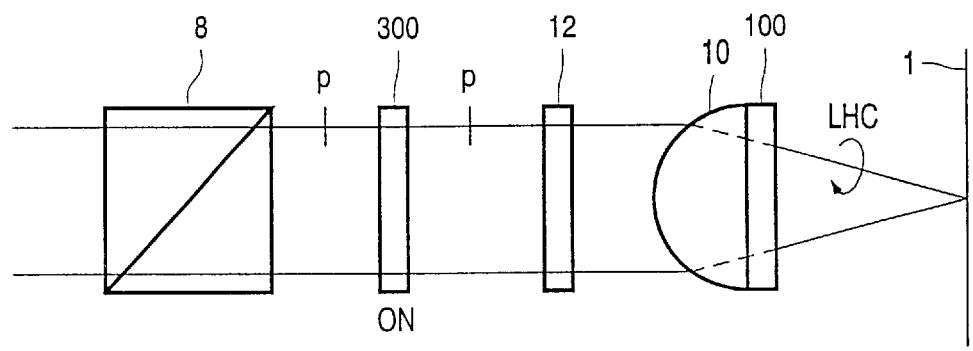

FIGS. 5(A) and 5(B) are graphs showing reflectivity characteristics of the arrangement of FIG. 4; and FIGS. 6(A) and 6(B) are schematic illustrations of a third embodiment of the invention.

Figure 1:
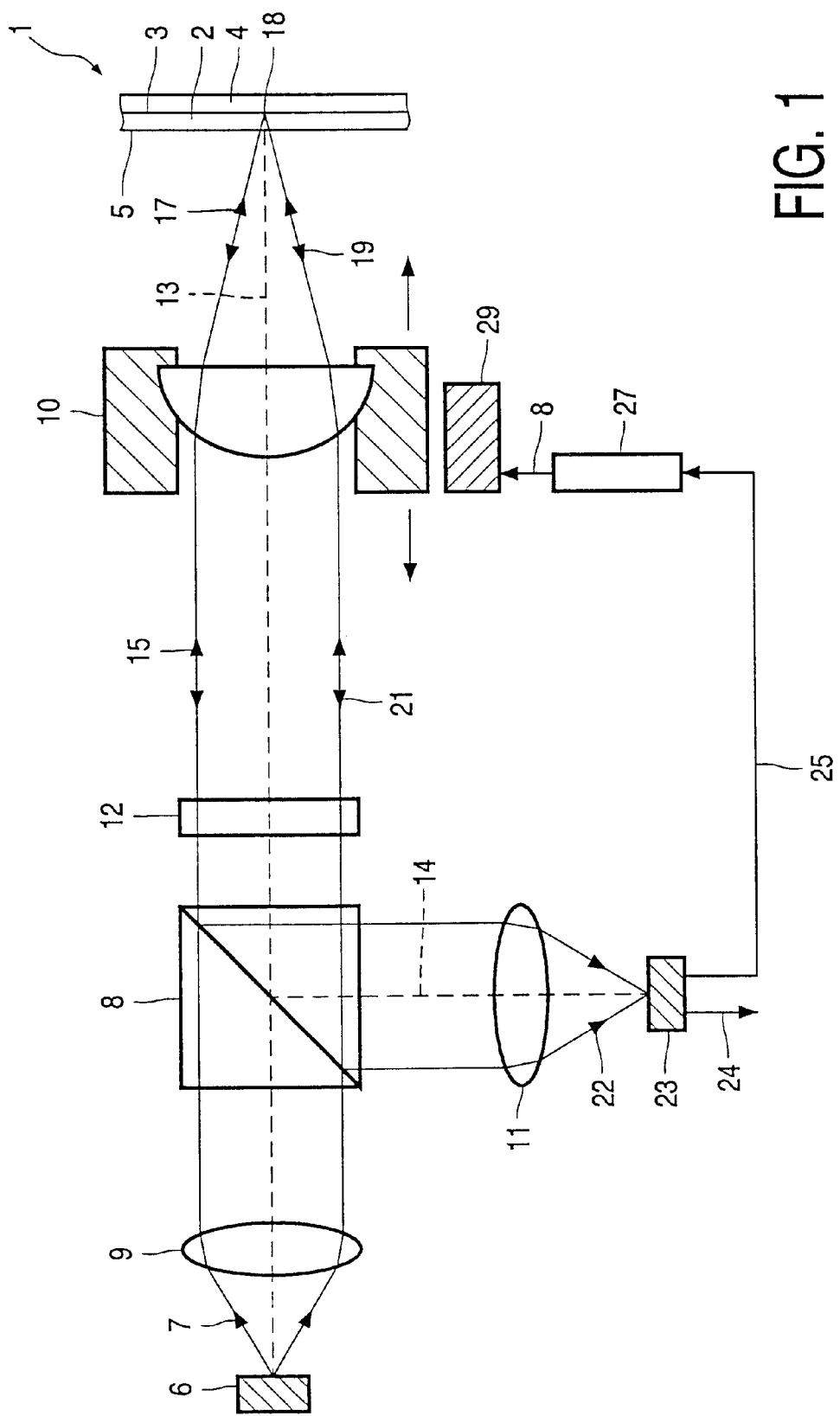
FIG. 1 is a schematic illustration of components common to a device in accordance with each of first to fourth embodiments of the invention.

FIG. 1 is a schematic illustration of components common to a device in accordance with each of the first to fourth embodiments, to be described below, for scanning an optical record carrier 1. The record carrier 1 is in these embodiments an optical disc as will be described, by way of example, below.

The optical disc 1 comprises a transparent layer 2, on one side of which at least one information layer 3 is arranged. The side of the information layer facing away from the transparent layer is protected from environmental influences by a protection layer 4. The side of the transparent layer facing the device is the disc entrance face 5. The transparent layer 2 acts as a substrate for the optical disc by providing mechanical support for the information layer or layers. Alternatively, the transparent layer 2 may have the sole function of protecting the information layer 3, while the mechanical support is provided by a layer on the other side of the information layer, for instance by the protection layer 4 or by a further information layer and transparent layer connected to the uppermost information layer.

Information may be stored in the information layer 3, or information layers, of the optical disc in the form of optically detectable marks arranged in substantially parallel, concentric or spiral tracks, not indicated in FIG. 1. The marks may be in any optically readable form, e.g. in the form of pits, or areas with a reflection coefficient or a direct of magnetisation different from their surroundings, or a combination of these forms.

The scanning device includes a radiation source 6, for example a semiconductor laser, emitting a diverging radiation beam 7 towards a lens system. The lens system includes a collimator lens 9, an objective lens 10 and a condenser lens 11 arranged along a main optical axis 13 and an output optical axis 14. Whilst objective lens 10 is shown as a single lens, it may be a compound lens, in which case the two or more lens elements are preferably fixed at a mutual relative spacing by a rigid mounting. The objective lens 10 is shown as a piano-convex lens; however other lens types such as convex-convex or convex-concave lenses may also be used. The objective lens 10 may also comprise a hologram operating in transmission or reflection, or a grating for coupling radiation out of a waveguide carrying the radiation beam.

The collimator lens 9 transforms the diverging radiation beam 7 to a collimated (substantially parallel) beam 15. A beam splitter 8, for example, a semi-transparent plate, transmits the incident beam. The objective lens 10 transforms the incident collimated radiation beam 15 into a converging beam 17, having a selected NA, which comes to a spot 18 on the information layer 3.

Radiation of the converging beam 17 reflected by the information layer 3 forms a diverging reflected beam 19, which returns along the optical path of the forward converging beam 17. The objective lens 10 transforms the reflected beam 19 to a substantially collimated reflected beam 21, and the beam splitter 8 separates the forward and reflected beams by reflecting at least part of the reflected beam 21 towards the condenser lens 11.

The condenser lens 11 transforms the incident beam into a convergent reflected beam 22 focused on detection systems, generally indicated by a single element 22 (in practice a plurality of detector elements may be used) in FIG. 1. The detection systems capture the radiation and convert it into electrical signals. One of these signals is an information signal 24, the value of which represents the information read from the information layer 3. Another signal is a focus error signal 25, the value of which represents the axial difference in height between the spot 18 and the information layer 3.

The signal 25 is input to a focus servo controller 27. The focus error signal 25 is used to generate a focus control signal 28 for a focus servo motor 29, which controls the axial position of the objective lens 10 such that the axial position of the spot 18 coincides substantially with the plane of the information layer 3 in the area of the spot.

Unwanted spherical aberrations may arise in the optical system, for example when the radiation beam has to be focused through a depth of optical disc which is thicker or thinner than a thickness for which the objective lens is currently adjusted. These may optionally be compensated for by a spherical aberration compensation optical subsystem, such as a subsystem which includes an electro-optical device, located in the optical path between the beam splitter 8 and the optical disc 1, as described in our co-pending application EP 99203184.9. The features of such an electro-optical device are incorporated herein by reference.

In order to increase the information reading efficiency of the arrangement, a polarisation modifying optical element, for example a quarter wavelength plate 12, is preferably present in the optical path at a location in the optical path between the beam splitter 8 and the optical disc 1. The quarter wavelength plate 12 converts the linear-polarised radiation emitted from the laser to a circular-polarised radiation of a particular handedness, and the quarter wavelength plate reconverts the beam to a linear polarisation which is perpendicular to the original linear polarisation. The beam splitter 8 is preferably a polarising beam splitter which acts in combination with the polarisation modifying optical element to ensure a greater output efficiently from the beam splitter 8 towards the detector 23.

In the following descriptions of each of the first to fourth embodiments, it is to be appreciated that the above discussion relating to FIG. 1 is intended to apply thereto, and that the components present, or modifications thereof as described in relation to FIG. 1, are intended to be included in each of the first to fourth embodiments.

Figure 2:
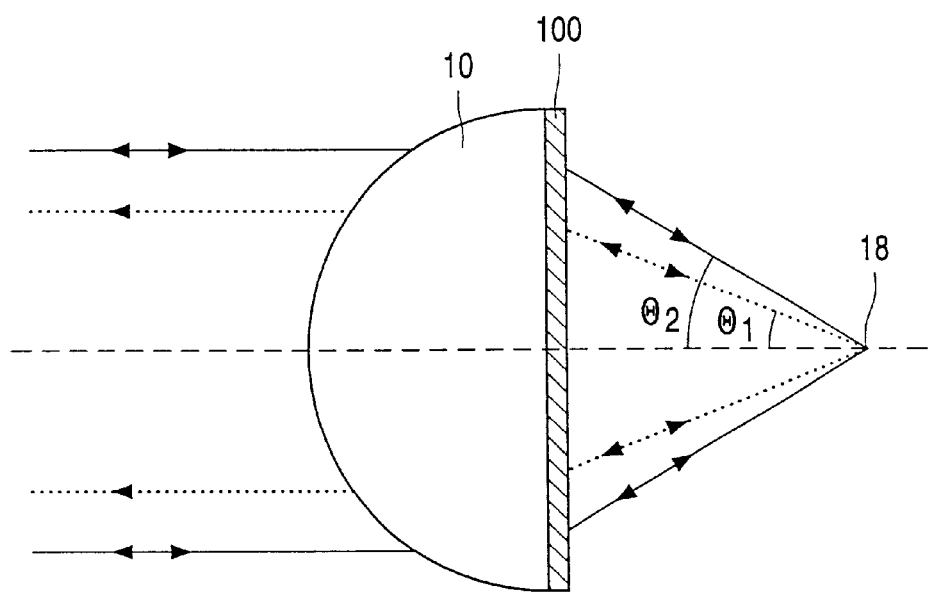
FIG. 2 is a schematic illustration of an objective lens arrangement in accordance with a first embodiment of the invention.
Figure 3:
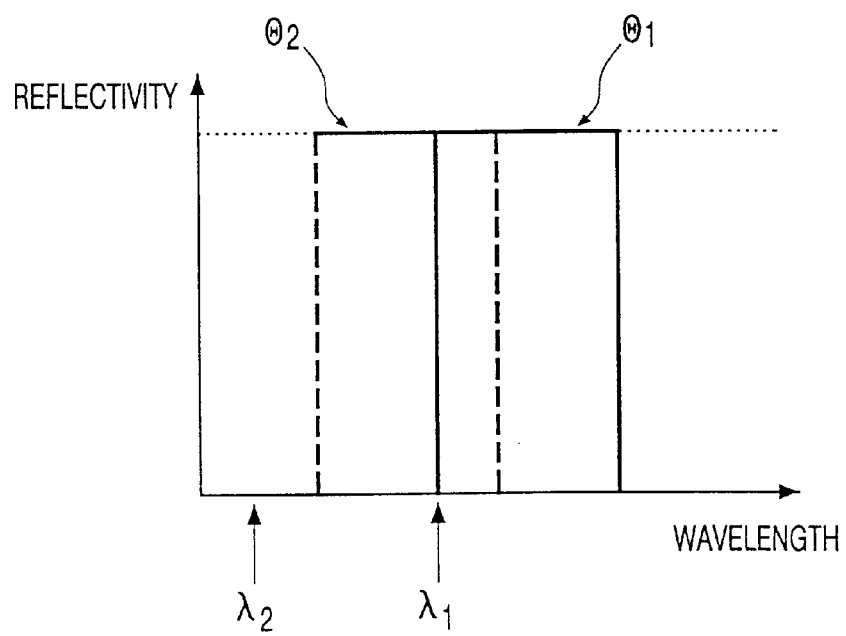
FIG. 3 is a graph showing reflectivity characteristics of the arrangement of FIG. 2.

Referring now to FIG. 2, in a first embodiment of the invention, the optical system of the optical scanning device of FIG. 1 includes a substantially uniform cholesteric liquid crystal layer 100 designed to act as a selective optical diaphragm. The layer 100 is of a substantially uniform thickness and is placed between the objective lens 10 and the location of the optical disc, that is to say in the converging part of the forward beam. Where the objective lens 10 includes a plano-convex lens, as illustrated, the cholesteric layer 100 is preferably arranged directly against the rear planar face of the lens. The layer 100 is designed to restrict the NA of the objective lens 10 for radiation of a first predetermined wavelength, $\lambda_1$, to $NA_1$. On the other hand, the NA of the objective lens 10 is not restricted for radiation of a second predetermined wavelength $\lambda_2$, thereby providing a larger NA, $NA_2$. This is illustrated in FIGS. 2 and 3, where $NA_1 = \sin\theta_1$ and $NA_2 = \sin\theta_2$, $\theta$ being the angle of travel relative to the optical axis.

In order to ensure that the cholesteric layer 100 is reflective between $\theta_1$ and $\theta_2$ for $\lambda_1$ but transmissive up to $\theta_1$ for $\lambda_1$, the following relations are made true by the design of layer 100:

$$\lambda_1 = n_e p \sqrt{1 - \sin\theta_1^2 / \bar{n}^2} \quad (1)$$

$$\lambda_1 < n_e p \sqrt{1 - \sin\theta_2^2 / \bar{n}^2} \quad (2)$$

Furthermore, the handedness of the cholesteric helix is selected to be equal to that of the incident circularly-polarised radiation of wavelength $\lambda_1$.

Finally, in order to ensure that the layer 100 is wholly transmissive for $\lambda_2$, the following relation is also made true:

$$\lambda_2 < n_e p \sqrt{1 - \sin\theta_2^2 / \bar{n}^2} \quad (3)$$

The resulting reflectivity characteristics are illustrated in FIG. 3, in which the location of the reflection bands at angles $\theta_1$ and $\theta_2$ is shown. As will be appreciated, radiation at wavelength $\lambda$, will fall within a reflection band for all angles between $\theta_1$ and $\theta_2$.

All the above relations are satisfied by providing a cholesteric material of the appropriate helical pitch p and refractive indices $n_o$ and $n_e$. Whilst $n_o$ and $n_e$ do not exhibit a great deal of variation, and here are assumed throughout at values of approximately 1.5 and 1.6, the helical pitch p can be varied considerably.

The above relations provide cholesteric layers which have selective diaphragm effects suitable for any selected combination of standard optical disc formats. For example, to provide a CD and DVD compatible scanner, the above relations are designed to be satisfied for $\lambda_1 = 780$ nm, $NA_1 = 0.45$ (CD) and $\lambda_2 = 650$ nm, $NA_2 = 0.60$ (DVD). Other combinations of the wavelengths and NAs for any two different formats, such as those described in the introduction, will similarly provide suitable values for the pitch value in the cholesteric layer 100.

The cholesteric layer 100 is wholly transmissive for the reflected radiation beam, irrespective of wavelength, because the handedness of the polarisation of the radiation is switched on reflection from the optical disc.

A potential drawback of this embodiment is that the cholesteric layer 100, being placed in a convergent part of the beam, introduces continually-varying radial phase variations, or spherical aberrations, into the beam. However, these can be compensated for, as described above.

In the above described embodiment a single laser source 6 may be used to generate radiation beams at the different wavelengths $\lambda_1$ and $\lambda_2$. Alternatively, two separate sources may be used. The same applies in relation to the second embodiment of the invention, to be described below.

Referring now to FIG. 4, in a second embodiment of the invention the optical system of the optical scanning device of FIG. 1 includes a non-uniform cholesteric liquid crystal layer 200 designed to act as a selective optical diaphragm.

The layer 200 is of a substantially uniform thickness and is placed between the quarter wavelength plate 12 and the objective lens, that is to say in the collimated part of the radiation beam. Hence, continually-varying radial phase variations, are not generated by layer 200. Although not illustrated in FIG. 4, the layer 200 is preferably arranged directly against the rear planar face of the quarter wavelength plate.

The layer 200 is designed to alter the NA of the optical system of the scanning device in dependence on the wavelength of the incident radiation, as described above in relation to the first embodiment. The layer 200 is designed to restrict the NA of the objective lens 10 for radiation of a first predetermined wavelength, $\lambda_1$, to $NA_1$. On the other hand, the NA of the objective lens 10 is not restricted for radiation of a second predetermined wavelength $\lambda_2$, thereby providing a larger NA, $NA_2$.

In this embodiment, the layer 200 includes two portions, a circular central portion 202 and an outer annular ring portion 204. The two portions have different helical pitches, $p_{centre}$ and $p_{ring}$ respectively. The two portions may be manufactured separately before being placed together. A more efficient method is the production of a single cholesteric liquid crystal layer having a locally-varying helical pitch, as is described, for example, in our co-pending patent application nos. WO 00/34808 and EP 99203288.8 The ring portion 204 corresponds in location to the variation in NA desired, namely from $NA_1$ to $NA_2$. The helical pitch $p_{ring}$ of the ring portion 204 is selected to provide (substantially total) internal reflection for the first wavelength $\lambda_1$. Whilst any value may be chosen for $p_{ring}$ which provides a reflection band lying over $\lambda_1$ a maximum amount of reflection is provided at the centre of the reflection band. Therefore, the preferred value for $p_{ring}$ is:

$$p_{ring} = \lambda_1 / \bar{n} \quad (4)$$

where $$\bar{n} = \frac{n_o + n_e}{2}.$$

Other relations to be satisfied for the desired optical diaphragm operation are as follows:

$$p_{ring} > \lambda_2 / n_o \quad \text{or} \quad p_{ring} < \lambda_2 / n_e \quad (5)$$

$$p_{centre} > \lambda_2 / n_o \quad \text{or} \quad p_{centre} < \lambda_2 / n_e \quad (6)$$

$$p_{centre} > \lambda_1 / n_o \quad \text{or} \quad p_{centre} < \lambda_1 / n_e \quad (7)$$

In the above it is assumed that the radiation of the second wavelength $\lambda_2$ has the same circular polarisation as the radiation of the first wavelength and the helix of the cholesteric material. However, the cholesteric layer 200 may also be made transmissive by arranging the radiation of the second wavelength to have the opposite circular polarisation, in which case relations (5) and (6) need not apply.

Whilst it is possible to provide an effective optical diaphragm, which alters the NA of the optical system in which the layer 200 is used, by means of the above formulations alone, a preferred feature of the second embodiment is that the phase profile of the radiation beam passing through the layer 200 is not altered by the layer itself. This requires the optical path length created by the outer portion 204 to be equal to that presented by the inner portion 202, as far as the second wavelength $\lambda_2$ is concerned. This can be achieved by selecting an appropriate value for the pitch $p_{center}$.

The phase change experienced by the radiation of wavelength of $\lambda_2$, when the handedness of the circular polarisation of the radiation is the same as that of the cholesteric helix, is as follows:

$$\phi -= \frac{2\pi d \bar{n}}{\lambda} - \frac{\pi d (\Delta n)^2}{4\lambda \bar{n}} \frac{(\bar{n}p/\lambda)^2}{(\bar{n}p/\lambda) - 1} \quad (8)$$

On the other hand, for radiation of wavelength $\lambda_2$ having an opposite handedness in circular polarisation, the phase change undergone is as follows:

$$\phi += \frac{2\pi d \bar{n}}{\lambda} + \frac{\pi d (\Delta n)^2}{4\lambda \bar{n}} \frac{(\bar{n}p/\lambda)^2}{(\bar{n}p/\lambda) + 1} \quad (9)$$

It has been found that a match between the phase changes occurring in the central portion 202 and the outer ring portion 204, where the layer is of uniform thickness throughout, is possible. The handedness of the circularly polarised radiation is preferably equal to that of cholesteric helix. In order to match the phase changes, the follow relation applies:

$$\frac{(\bar{n}p_{center}/\lambda_2)^2}{\bar{n}p_{center}/\lambda_2) - 1} = \frac{(\bar{n}p_{ring}/\lambda_2)^2}{(\bar{n}p_{ring}/\lambda_2) - 1} \quad (10)$$

A solution to this relation is as follows:

$$\bar{n}p_{center}/\lambda_2 = \frac{\bar{n}p_{ring}/\lambda_2}{(\bar{n}p_{ring}/\lambda_2) - 1} \quad (11)$$

Otherwise stated, a solution is:

$$p_{center} = \frac{\lambda_2/\bar{n}}{1 - \lambda_2/\lambda_1} \quad (12)$$

Thus, with values chosen for the pitch of the cholesteric helix in the central portion 202 and the outer ring portion 204 as described above, it is possible to provide a layer 200 which creates no radial phase differences in the forward beam when placed in a collimated part of the beam. If for example $\lambda_1$=780 nm (CD), $\lambda_2$=660 nm (DVD+RW) and $\bar{n}$=15, the solution given is $p_{ring}$=0.52 µm and $p_{centre}$=2.9 µm. Other combinations of the wavelengths for any two different formats, such as those described in the introduction, will similarly provide suitable values for the pitch values in the cholesteric layer 200 to be used in an optical scanning device.

Since on reflection at the optical disc the handedness of the circular polarisation will reverse, radial phase changes do occur in the reverse beam. However, these are relatively minor and may have no substantial effect on the operation of the system, or may be compensated for as required. The phase difference induced between the inner and outer parts of the beam is given using the following relation:

$$\Delta\phi = \frac{\pi d(\Delta n)^2}{4\lambda_2 \bar{n}} \left[ \frac{(\bar{n}p_{center}/\lambda_2)^2}{(\bar{n}p_{center}/\lambda_2) + 1} - \frac{(\bar{n}p_{ring}/\lambda_2)^2}{(\bar{n}p_{ring}/\lambda_2) + 1} \right] \quad (13)$$

In order to provide a sufficient optical diaphragm effect, the amount of reflection provided by the ring portion 204 for radiation of wavelength $\lambda_1$ should be sufficient. The penetration depth l, defined as the distance over which the amplitude of the radiation is reduced by the factor of 1/e, is defined by the following relation:

$$l = \frac{\sqrt{2}}{\pi} \frac{\bar{n}p_{ring}}{\Delta n} \quad (14)$$

For a birefringence of $\Delta n = n_e - n_o = 0.1$, the penetration depth l has the value of appropriate 3.5 µm. The amount of transmission in the outer ring portion 204 for radiation of wavelength $\lambda_1$ is preferably 1% or less, in which case the thickness d of the layer is preferably log 10, i.e. 2.3, times l. Again taking $\Delta n$=0.1, the thickness of the layer is 200 is thus preferably at least 8.1 µm.

Whist in the above-described second embodiment a layer having central and outer cholesteric portions, and a uniform thickness between those portions, is described, it should be mentioned that a similar optical diaphragm effect may be achieved by means of a cholesteric outer ring portion alone, or by such central an outer portions but with different thicknesses. Furthermore, a non-uniform optical diaphragm as described may also be used in a non-collimated part of the optical system.

In the above-described first and second embodiments of the invention, the optical diaphragm effect is used to switch between different NAs when different wavelengths of radiation are used. In the third and fourth embodiments of the invention, to be described below, the optical diaphragm effect is used to switch between different NAs without necessarily altering the wavelength of radiation used.

Referring now to FIGS. 6(A) and 6(B), in a third embodiment of the invention, a cholesteric layer 100, similar to that of the first embodiment described above, is used in combination with a polarisation-switching element 300, for example a known Twisted Nematic (TN) liquid crystal cell. The TN cell 300 is effective, in its off state, to modify the linear polarisation of the incident light beam by 90° (from a p-state to an s-state). However, when an appropriate voltage is applied across the electrodes of the TN cell 300, in its on state, the linear polarisation of the beam is unaffected by the cell (i.e. p-state remains p-state). In order to achieve a variation in optical aperture from $NA_1$ (=sin $\theta_1$) to $NA_2$ (=sin $\theta_2$) on switching of the TN cell 300, the following relations are designed to hold true for the cholesteric layer 100:

$$\lambda = n_o p \sqrt{1 - \sin\theta_1^2/\bar{n}^2} \quad (16)$$

$$\lambda \leq n_e p \sqrt{1 - \sin\theta_2^2/\bar{n}^2} \quad (17)$$

In one state of the TN cell 300 the handedness of the circular polarisation of the incident radiation coincides with that of the cholesteric material, in which case (substantially total) internal reflection occurs in the outer portion of the layer 100 (FIG. 6(B)).

In the other state the radiation has the opposite handedness and the whole beam passes through the layer (FIG. 6(A)). In this state, the radiation when reflected adopts the opposite handedness and thus the outer portion of the reverse beam is reflected back towards the optical disc, and is unlikely to provide any useful additions to the read-out signal at the detector. However, the additional outer part of the beam, when switched on, could be used for writing purposes only.

In a fourth embodiment of the invention, a cholesteric layer 200 arranged in accordance with the second embodiment described above is used in the arrangement of FIG. 3 in place of the cholesteric layer 100 of the first embodiment.

From the above description it will be appreciated that the present invention provides various embodiments of an optical scanning device comprising means for scanning optical record carriers of predetermined different formats, such as CDs and DVDs, using scanning at different numerical apertures provided by an optical diaphragm. The optical diaphragm comprises cholesteric liquid crystal material of one or more selected helical pitches which provide the diaphragm with desired wavelength- and/or polarisation-selective characteristics.

Whilst various embodiments have been described above, along with modifications and variations thereof, it is to be appreciated that the invention is not limited thereto. Various further modifications and variations may be employed without departing from the scope of the invention, which is defined in the accompanying claims.

What is claimed is:

1. An optical scanning device for scanning an optical record carrier, said device comprising a radiation source for generating a radiation beam, which beam is directed along an optical axis of the device, and an optical diaphragm for reducing the intensity of a portion of the beam having radiation of a first wavelength and not reducing the intensity of said portion of the beam having radiation of a second different wavelength, characterized in that said optical diaphragm includes a cholesteric liquid crystal material having a helical pitch selected to provide internal reflection of said portion of the beam.

2. An optical device according to claim 1, wherein the device is arranged such that the beam is in a non-collimated state at said diaphragm, and said diaphragm is arranged to provide internal reflection for a selected range of angles of incidence, with which said portion of the beam falls on the optical diaphragm in its non-collimated state.

3. An optical device according to claim 2, wherein said portion of the beam is a portion radially spaced from the optical axis, and the beam is in a convergent state in said selected part of the optical axis.

4. An optical device according to claim 3, wherein said device comprises an objective lens for focusing the beam to a spot at said optical record carrier and said optical diaphragm is located between the objective lens and the optical record carrier.

5. An optical device according to claim 1, wherein said diaphragm includes only cholesteric material of a substantial uniform helical pitch.

6. An optical device according to claim 1, wherein the device is arranged such that the beam is in a substantially collimated state at said diaphragm, and said cholesteric liquid crystal material, having a helical pitch selected to provide internal reflection of said portion of the beam, is selectively located in said portion of said beam.

7. An optical scanning device according to claim 6, wherein said device comprises an objective lens for focusing the beam to a spot at said optical record carrier and said optical diaphragm is located between the radiation source and the objective lens.

8. An optical device according to claim 6, wherein said diaphragm comprises cholesteric liquid crystal material of varying helical pitch, material having a helical pitch within a range providing said internal reflection being selectively located in said portion of the beam.

9. An optical device according to claim 6, wherein said cholesteric liquid crystal material, having a helical pitch selected to provide internal reflection of said portion of the beam, comprises an annular ring portion.

10. An optical device according to claim 1, comprising a second radiation source for generating a different radiation beam of said second different wavelength, said pitch of said cholesteric material being selected such that said diaphragm is substantially fully transmissive to said different beam.

11. An optical device according to claim 10, wherein said diaphragm comprises an inner portion inside said annular ring portion, said inner portion comprising cholesteric internal of a different helical pitch and said annular ring portion, which different helical pitch is selected to be substantially fully transmissive to both said first-mentioned beam and said different beam.

12. An optical device according to claim 11, wherein said inner portion and said annular ring portion comprising cholesteric material having helical pitches selected to match phase changes generated when said second beam is transmitted through said diaphragm.

13. An optical device according to claim 1, comprising a polarization-modifying element for selectively modifying the polarization of the beam at said diaphragm, thereby switching between a state in which said portion of the beam is internally reflected and a state in which said portion of the beam is substantially fully transmitted.

14. An optical device according to claim 1, wherein said diaphragm comprises a layer of substantial uniform thickness.

15. An optical device according to claim 1, said device comprising means for scanning an optical record carriers of predetermined different physical formats using scanning and different numerical temperatures provided by said optical diaphragm.

16. An optical diaphragm for use in scanning an optical record carrier using a radiation beam of a predetermined wavelength, said optical diaphragm being for reducing the intensity of a portion of the beam, characterized in that said optical diaphragm includes a cholesteric liquid crystal material having a varying helical pitch selected to provide internal reflection of said portion of the beam.

17. An optical diaphragm according to claim 16, arranged such that when the beam it is in a non-collimated state at said diaphragm, said diaphragm is arranged to provide internal reflection for a selected range of angles of incidence, with which said portion of the beam falls on the optical diaphragm in its non-collimated state.

18. An optical diaphragm according to claim 16, wherein said diaphragm includes only cholesteric material of a special uniform helical pitch.

19. An optical diaphragm according to claim 16, arranged such that when the beam is in a substantially collimated state at said diaphragm, said cholesteric liquid crystal material, having a helical pitch selected to provide internal reflection of said portion of the beam, is selectively located in said portion of said beam.

20. An optical diaphragm according to claim 19, wherein said diaphragm comprises cholesteric liquid crystal material of varying helical pitch, material having a helical pitch within a range providing said internal reflection being selectively located in said diaphragm.

21. An optical diaphragm according to claim 20, wherein said cholesteric liquid crystal material having a helical pitch selected to provide internal reflection of said portion of the beam, comprises an annular ring portion.

22. An optical diaphragm according to claim 21, wherein said diaphragm comprises an inner portion inside said annular ring portion, said inner portion comprising cholesteric material of a different helical pitch than said annular ring portion.

23. An optical diaphragm according to claim 22, wherein said inner portion and said annular ring portion comprise cholesteric having helical pitches selected to match phase changes generated when a selected beam is transmitted through said diaphragm.

24. An optical diaphragm according to claim 16, wherein said diaphragm comprises a cholesteric layer of substantially uniform thickness.

* * * * *